US011349124B2

(12) United States Patent
Wang (10) Patent No.: US 11,349,124 B2
(45) Date of Patent: May 31, 2022

(54) ELECTROCHEMICAL DEVICE (71) Applicant: NINGDE AMPEREX TECHNOLOGY LIMITED, Ningde (CN)

(72) Inventor: Kefei Wang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 253 days.

(21) Appl. No.: 16/648,494

(22) PCT Filed: Mar. 4, 2020

(86) PCT No.: PCT/CN2020/077773
§ 371 (c)(1),
(2) Date: Mar. 18, 2020

(87) PCT Pub. No.: WO2020/244260
PCT Pub. Date: Dec. 10, 2020

(65) Prior Publication Data
US 2021/0408547 A1 Dec. 30, 2021

(30) Foreign Application Priority Data
Jun. 3, 2019 (CN) .......................... 201910475225.5

(51) Int. Cl.
H01M 4/62 (2006.01)
H01M 10/0525 (2010.01)
H01M 10/0567 (2010.01)
H01M 4/02 (2006.01)

(52) U.S. Cl.
CPC .......... H01M 4/623 (2013.01); H01M 4/628 (2013.01); H01M 10/0525 (2013.01); H01M 10/0567 (2013.01); H01M 2004/028 (2013.01); H01M 2300/0025 (2013.01)

(58) Field of Classification Search
CPC ......... H01M 10/0525; H01M 10/0567; H01M 2004/028; H01M 2300/0025; H01M 4/623; H01M 4/628
See application file for complete search history.

(56) References Cited

U.S. PATENT DOCUMENTS

| 6,335,857 B1 | 1/2002 | Takimoto et al. |
| 2014/0356734 A1 | 12/2014 | Ren et al. |
| 2018/0183097 A1 | 6/2018 | Yamazaki et al. |

FOREIGN PATENT DOCUMENTS

| CN | 1715327 A | 1/2006 |
| CN | 101826640 B | 1/2013 |
| CN | 103588921 A | 2/2014 |
| CN | 104466247 A | 3/2015 |
| CN | 104766995 A | 7/2015 |
| CN | 104900913 A | 9/2015 |
| CN | 106025339 A | 10/2016 |
| CN | 106450327 A | 2/2017 |
| CN | 105085762 B | 8/2017 |
| CN | 107580732 A | 1/2018 |
| CN | 109473713 A | 3/2019 |
| CN | 109599548 A | 4/2019 |
| CN | 109786834 A | 5/2019 |
| CN | 110165219 A | 8/2019 |
| EP | 219771 A1 | 9/2017 |
| EP | 3392931 A1 | 10/2018 |
| JP | 2003109574 A | 4/2003 |
| JP | 2014165037 A | 9/2014 |
| JP | 2015195135 A | 11/2015 |
| KR | 20160146580 A | 12/2016 |
| WO | 0193363 A2 | 12/2001 |

OTHER PUBLICATIONS

Korean Office Action dated Apr. 29, 2021 in counterpart Korean application KR10-2020-7009345, 4 pages in Korean.
"Electric energy storage properties of poly(vinylidene fluoride)," Li et al., Applied Physics Letters, 2010, vol. 95, 192905, Oct. 5, 2020, pp. 1-3 in English.
Chinese Notice of Allowance dated Oct. 26, 2021 in counterpart Chinese application CN202011152025.5, 4 pages in Chinese.
Chinese Notice of Allowance and Search Report dated Sep. 4, 2020 in counterpart Chinese application 201910475225.5, 3 pages in Chinese.
"1,4-Dicyanobutane as a film-forming additive for high-voltage in lithium-ion batteries," Han et al., Solid State Ionics, vol. 337, pp. 63-69, Apr. 17, 2019, 6 pages in English.
"Electrolyte Additives for Interfacial Modification of Cathodes in Lithium-Ion Battery," Jiang et al., Progress in Chemistry, vol. 31, Issue 5, Mar. 21, 2019, 15 pages in Chinese with 1-page English abstract.
International Search Report dated May 29, 2020 in counterpart PCT application PCT/CN2020/077773, 5 pages.
PCT Written Opinion dated May 29, 2020 in counterpart PCT application PCT/CN2020/077773, 4 pages.
Chinese First Office Action dated Jun. 22, 2020 in counterpart Chinese application 201910475225.5, 5 pages.
"A novel polymer composite as cathode binder of lithium ion batteries with improved rate capability and cyclic stability," Fu et al., Journal of Power Sources, 261 (2014) pp. 170-174.
Indian Office Action and Search Report dated Jan. 21, 2022 in counterpart Indian application 202027012828, 7 pages in English.

Primary Examiner — Carlos Barcena
(74) Attorney, Agent, or Firm — Juan Carlos A. Marquez; Marquez IP Law Office, PLLC (57) ABSTRACT The subject application relates to an electrochemical device including a cathode, an anode and an electrolyte. The cathode includes a fluoropolymer which has an X-ray diffraction spectrum with a diffraction peak in the range of $34° \leq 2\theta \leq 38°$. The electrolyte includes a compound having 2 to 3 cyano groups. The electrochemical device of the present application has excellent cycle and high temperature storage properties.

20 Claims, 1 Drawing Sheet

ELECTROCHEMICAL DEVICE

CROSS REFERENCE TO RELATED APPLICATIONS

The present application is a U.S. National Stage application of PCT international application: PCT/CN2020/077773 which claims the benefit of priority from the China Patent Application No. 201910475225.5, filed on 3 Jun. 2019, the disclosure of which is hereby incorporated by reference in its entirety.

BACKGROUND

1. Technical Field

The present application relates to the technical field of energy storage, and more particularly to an electrochemical device.

2. Description of the Related Art

As technology advances and demands for mobile devices increase, there is a remarkable increase in the demands for secondary batteries. Therefore, various studies have been conducted on batteries that can meet various demands. In particular, as a power supply of such devices, lithium secondary batteries having excellent life and cycle characteristics as well as high energy density are being actively studied.

However, the lithium secondary batteries have the problem that their battery life is rapidly shortened due to repeated charging and discharging. Such shortening of battery life is caused by side reactions between cathodes and electrolytes, and this phenomenon may become more severe under high voltage and high temperature conditions. Therefore, there is a need to develop a secondary battery suitable for being used under high voltage and high temperature conditions. To this end, there is an urgent need to develop a technology for controlling reactions at an electrode interface or side reactions between cathode active materials and electrolytes.

SUMMARY

The present application relates to an electrochemical device having great cycle life and high temperature storage properties.

In some embodiments, the electrochemical device includes a cathode, an anode and an electrolyte. The cathode includes a fluoropolymer. The X-ray diffraction spectrum of the fluoropolymer has a diffraction peak in the range of $34°≤2θ≤38°$. The use of the fluoropolymer in combination with a compound having 2 to 3 cyano groups in the electrolyte can surprisingly and significantly suppress the decomposition reaction of the electrolyte after high temperature charging, thereby improving cycle properties and high temperature storage stability of the electrochemical device.

In some embodiments, a better effect can be obtained when the fluoropolymer has a molecular weight distribution coefficient of $2≤Mw/Mn≤4$.

In some embodiments, the fluoropolymer includes at least one selected from the following monomers: vinylidene fluoride, hexafluoropropylene, pentafluoropropylene, tetrafluoropropylene, trifluoropropylene, perfluorobutene, hexafluorobutadiene, hexafluoroisobutylene, trifluoroethylene, chlorotrifluoroethylene, and tetrafluoroethylene. In some embodiments, the fluoropolymer includes polyvinylidene fluoride, which can form a more effective protection layer with the compound having 2 to 3 cyano groups, and thus further improved properties are attained.

In some embodiments, the compound having 2 to 3 cyano groups in the electrochemical device includes at least one of a dinitrile compound, a trinitrile compound, a dinitrile compound including an ether bond, or a trinitrile compound including an ether bond.

In some embodiments, the compound having 2 to 3 cyano groups includes succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptane-dinitrile, 1,4-bis(cyanoethoxy)butane, diethylene glycol bis(2-cyanoethyl)ether, triethylene glycol bis(2-cyanoethyl) ether, tetraethylene glycol bis(2-cyanoethyl)ether, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, 1,2,5-tris(cyanoethoxy)pentane, or any combination thereof.

In some embodiments, the compound having 2 to 3 cyano groups is contained in an amount of 0.01 wt % to 15 wt % based on the total weight of the electrolyte. The compound having 2 to 3 cyano groups includes at least two of succinonitrile, adiponitrile, ethylene glycol bis(propionitrile)ether, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, or 1,2,4-tris(2-cyanoethoxy)butane.

In some embodiments, the electrolyte further includes an additive A. The additive A can synergize with the compound having 2 to 3 cyano groups and the fluoropolymer to form a denser and high-quality composite protection film, and thus better effects are attained. The additive A includes at least one of cyclic carbonate containing a carbon-carbon double bond, a compound containing a sulfur-oxygen double bond, lithium difluorophosphate, or lithium tetrafluoroborate.

In some embodiments, the additive A includes at least one of vinylethylene carbonate, ethylene vinyl ethylene carbonate, 1,3-propane sultone, ethylene sulfate, propylene sulfate, ethylene sulfite, methylene methanedisulfonate, lithium difluorophosphate, or lithium tetrafluoroborate.

In some embodiments, the additive A is contained in an amount of 0.01 wt % to 5 wt % based on the total weight of the electrolyte.

In some embodiments, the electrolyte of the electrochemical device further includes a polynuclear molybdenum cluster ionic liquid which can synergize with the compound having 2 to 3 cyano groups, and thereby forming a better protection layer and achieving better effects. The polynuclear molybdenum cluster ionic liquid includes $[C_nH_{2n+1}\text{-methylimidazole}]_2[Mo_6O_{19}]$, wherein $n=1\text{-}20$ and the polynuclear molybdenum cluster ionic liquid is contained in an amount of 0.01 wt % to 5 wt % based on the total weight of the electrolyte.

In some embodiments, the cathode of the electrochemical device further includes a cathode active material and a polynuclear molybdenum cluster ionic liquid. The polynuclear molybdenum cluster ionic liquid can synergize with the fluoropolymer to prevent side reactions at the interface between the cathode and the electrolyte. The polynuclear molybdenum cluster ionic liquid includes $[C_nH_{2n+1}\text{-methylimidazole}]_2[Mo_6O_{19}]$, wherein n=1 to 20 and the polynuclear molybdenum cluster ionic liquid is contained in an amount of 0.01 wt % to 2 wt % based on the weight of the cathode active material.

In some embodiments, the fluoropolymer used in the electrochemical device has a crystallinity of 45% to 50%.

The present application also relates to an electronic device, including the electrochemical device as described above.

BRIEF DESCRIPTION OF THE DRAWINGS

The accompanying drawings required for illustrating the embodiments of the present application or the prior art will be described briefly hereinafter so as to depict the embodiments of the present application.

DETAILED DESCRIPTION

Embodiments of the present application will be described in detail below.

The embodiments described herein with respect to the accompanying drawings are illustrative and graphical, and are used for providing a basic understanding of the present application. The embodiments of the present application should not be construed as limitations on the present application.

As used herein, the terms "substantially", "generally", "essentially" and "about" are used to describe and indicate small variations. When being used in combination with an event or circumstance, these terms may refer to examples wherein the event or circumstance occurs precisely, and examples wherein the event or circumstance occurs approximately. For example, when being used in combination with a value, these terms may refer to a variation in a range of less than or equal to ±10% of the value, for example, less than or equal to ±5%, less than or equal to ±4%, less than or equal to ±3%, less than or equal to ±2%, less than or equal to +1%, less than or equal to ±0.5%, less than or equal to ±0.1%, or less than or equal to ±0.05%. For example, if the difference between two values is less than or equal to ±10% of the average of the values (for example, less than or equal to ±5%, less than or equal to ±4%, less than or equal to ±3%, less than or equal to ±2%, less than or equal to 1%, less than or equal to ±0.5%, less than or equal to 0.1%, or less than or equal to +0.05%), then the two values can be considered "substantially" the same.

In addition, amounts, ratios and other numerical values are sometimes presented herein in a range format. It should be appreciated that such range formats are for convenience and conciseness, and should be flexibly understood as comprising not only values explicitly specified in the range restriction, but also all individual values or sub-ranges within the ranges, like explicitly specifying each value and each sub-range.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The electrochemical device of the present application includes any device that undergoes an electrochemical reaction. The specific examples of the electrochemical device include all kinds of primary batteries, secondary batteries, fuel cells, solar cells or capacitors. In particular, the electrochemical device is a lithium secondary battery.

Cathode

The cathode has a cathode active material layer on one or two surfaces of a cathode current collector. In some embodiments, the cathode current collector may be made of, for example, a conductive material such as aluminum, nickel or stainless steel. The cathode active material layer includes a cathode active material, a conductive agent and an adhesive. In some embodiments, the cathode active material layer may further include other additives.

In the embodiments according to the present application, the cathode active material layer includes an adhesive. The adhesive may be used to improve the adhesion properties of cathode active materials between each other and to a current collector. Examples of the adhesive include one or more of synthetic rubber, polymer materials, or the like. Examples of the synthetic rubber include styrene butadiene rubber, fluorine rubber or ethylene-propylene-diene rubber.

In some embodiment modes, the adhesive is selected from polymer materials. In particular, the adhesive includes a fluoropolymer, the X-ray diffraction spectrum of which has a diffraction peak in the range of $34° \leq 2\theta \leq 38°$.

The use of the fluoropolymer in combination with an electrolyte additive (a compound having 2 to 3 cyano groups) described below can surprisingly and remarkably suppress the decomposition reaction of an electrolyte after high temperature charging.

In some embodiments, the fluoropolymer has a molecular weight distribution coefficient of $2 \leq Mw/Mn \leq 4$, for example, of 2, 2.5, 3, 3.5, 4, or any range therebetween.

In some embodiments, the fluoropolymer has an Si element content of not more than 100 ppm, for example, of 100 ppm, 90 ppm, 80 ppm, 70 ppm, 60 ppm, 50 ppm, 40 ppm, 30 ppm, 20 ppm, 10 ppm, or any range therebetween.

In some embodiments, the fluoropolymer has a crystallinity of about 45% to about 50%, which can further improve cycle and storage properties.

In some embodiments, the fluoropolymer includes at least one of the following monomers: vinylidene fluoride, hexafluoropropylene, pentafluoropropylene, tetrafluoropropylene, trifluoropropylene, perfluorobutene, hexafluorobutadiene, hexafluoroisobutylene, trifluoroethylene, chlorotrifluoroethylene and tetrafluoroethylene. In some embodiments, the fluoropolymer includes polyvinylidene fluoride. When the polyvinylidene fluoride meets the above molecular weight distribution and the X-ray diffraction spectrum thereof has a diffraction peak in the range of 34°≤2θ≤38°, better effects can be provided.

In some embodiments, the adhesive may further include, but is not limited to, polyvinyl alcohol, carboxymethylcellulose, hydroxypropyl cellulose, hydroxyethyl cellulose, hydroxymethyl cellulose, hydroxypropyl methylcellulose, hydroxyethyl methylcellulose, hydroxymethyl methylcellulose, hydroxydiacetyl cellulose, polyvinyl chloride, carboxy polyvinyl chloride, polyvinyl fluoride, ethylene oxide-containing polymer, polyvinylpyrrolidone, polyurethane, polytetrafluoroethylene, polyethylene, polypropylene, styrene-butadiene rubber, acrylated styrene-butadiene rubber, epoxy resin, nylon, etc.

In some embodiments, the cathode further includes other additives such as a polynuclear molybdenum cluster ionic liquid including $[C_nH_{2n+1}\text{-methylimidazole}]_2[Mo_6O_{19}]$, n=1-20, which has a structure as follows:

In the present application, the mentioned polynuclear molybdenum cluster ionic liquid may be synthesized according to existing conventional synthesis methods. For example, reference may be made to Inorganica Chimica Acta 461 (2017) 1-7.

In some embodiments, the polynuclear molybdenum cluster ionic liquid is contained, based on the weight of the cathode active material, in an amount of about 0.01 wt % to about 2 wt %, for example, about 0.01 wt %, about 0.1 wt %, about 0.2 wt %, about 0.3 wt %, about 0.4 wt %, about 0.5 wt %, about 1.0 wt %, about 2.0 wt %, or any range therebetween.

The cathode active material layer includes one or more cathode active materials capable of deintercalating lithium ions. In some embodiments, the cathode active material layer may be one layer or multiple layers, wherein each of the multiple layers may have the same or different active materials.

In some embodiments, the cathode active material is a lithium-containing compound to provide high energy density. Examples of the lithium-containing compound include, but are not limited to, at least one of a lithium-transition metal composite oxide and a lithium-transition metal phosphate compound. The lithium-transition metal composite oxide is an oxide containing Li and one or more transition metal elements as constituent elements. The lithium-transition metal phosphate compound is a phosphate compound containing Li and one or more transition metal elements as constituent elements. In particular, in some embodiments, the transition metal element is one or more of Co, Ni, Mn, Fe, etc., thereby obtaining a higher voltage. The chemical formula of the lithium-containing compound is, for example, $Li_xM_1O_2$ or $Li_yM_2PO_4$, wherein $M_1$ and $M_2$ represent one or more transition metal elements. The values of x and y vary with charge and discharge states, and are usually in the ranges of 0.05≤x≤1.10 and 0.05≤y≤1.10.

Examples of the lithium-transition metal composite oxide include $LiCoO_2$, $LiNiO_2$, and a lithium nickel-based composite oxide represented by the formula $LiNi_{1-z}MzO_2$.

Examples of the lithium-transition metal phosphate compound include $LiFePO_4$ and $LiFe_{1-u}Mn_uPO_4$ (u<1), thereby obtaining high battery capacity and obtaining excellent cycle characteristics.

In the formula $LiNi_{1-z}MzO_2$, M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z meets 0.005<z<0.5.

For example, the following compounds may be used as the cathode active material:

$Li_aA_{1-b}H_bD_2$ (wherein 0.90≤a≤1.8 and 0≤b≤0.5); $Li_aE_{1-b}H_bO_{2-c}D_c$ (wherein 0.90≤a≤1.8, 0≤b≤0.5, and 0≤c≤0.05); $LiE_{2-b}H_bO_{4-c}D_c$ (wherein 0≤b≤0.5 and 0≤c≤0.05); $Li_aNi_{1-b-c}Co_bH_cD_\alpha$ (wherein 0.90≤a≤1.8, 0≤b≤0.5, 0≤c≤0.05 and 0<α≤2); $Li_aNi_{1-b-c}Co_bH_cO_{2-\alpha}L_\alpha$ (wherein 0.90≤a≤1.8, 0≤b≤0.5, 0≤c≤0.05 and 0<α<2); $Li_aNi_{1-b-c}Co_bH_cO_{2-\alpha}L_2$ (wherein 0.90≤a≤1.8, 0≤b≤0.5, 0≤c≤0.05 and 0<α<2); $Li_aNi_{1-b-c}Mn_bH_cD_\alpha$ (wherein 0.90≤a≤1.8, 0≤b≤0.5, 0≤c≤0.05 and 0<α≤2); $Li_aNi_{1-b-c}Mn_bH_cO_{2-\alpha}L_\alpha$ (wherein 0.90≤a≤1.8, 0≤b≤0.5, 0≤c≤0.05 and 0<α<2); $Li_aNi_{1-b-c}Mn_bH_cO_{2-\alpha}L_2$ (wherein 0.90≤a≤1.8, 0≤b≤0.5, 0≤c≤0.05 and 0<u<2); $Li_aNi_bE_cG_dO_2$ (wherein 0.90≤a≤1.8, 0≤b≤0.9, 0≤c≤0.5 and 0.001≤d≤0.1); $Li_aNi_bCo_cMn_dG_eO_2$ (wherein 0.90≤a≤1.8, 0≤b≤0.9, 0≤c≤0.5, 0≤d≤0.5 and 0.001≤e≤0.1); $Li_aNiG_bO_2$ (wherein 0.90≤a≤1.8 and 0.001≤b≤0.1); $Li_aCoG_bO_2$ (wherein 0.90≤a≤1.8 and 0.001≤b≤0.1); $Li_aMnG_bO_2$ (wherein 0.90≤a≤1.8 and 0.001≤b≤0.1); $Li_aMn_2G_bO_4$ (wherein 0.90≤a≤1.8 and 0.001≤b≤0.1); $QO_2$; $QS_2$; $LiQS_2$; $V_2O_5$; $LiV_2O_5$; $LiMO_2$; $LiNiVO_4$; $Li_{(3-f)}J_2(PO_4)_3$ (0≤f≤2); $Li_{(3-f)}Fe_2(PO_4)_3$ (0≤f≤2) or $LiFePO_4$.

In the above chemical formula, A is Ni, Co, Mn or a combination thereof; H is Al, Ni, Co, Mn, Cr, Fe, Mg, Sr, V, a rare earth element or a combination thereof; D is O, F, S, P or a combination thereof, and E is Co, Mn or a combination thereof; L is F, S, P or a combination thereof; G is Al, Cr, Mn, Fe, Mg, La, Ce, Sr, V or a combination thereof, Q is Ti, Mo, Mn or a combination thereof; M is Cr, V, Fe, Sc, Y or a combination thereof; and J is V, Cr, Mn, Co, Ni, Cu or a combination thereof.

The cathode active material may have a coating layer on a surface thereof or may be mixed with another kind of compound having a coating layer. The coating layer may include at least one compound of the coating element compound selected from oxides of the coating element, hydroxides of the coating element, oxyhydroxides of the coating element, carbonate oxides of the coating element, or hydroxycarbonates of the coating element. The coating element compound of the coating layer may be amorphous or crystalline. The coating elements included in the coating layer may include Mg, Al, Co, K, Na, Ca, Si, Ti, V, Sn, Ge, Ga, B, As, Zr, or a mixture thereof. These elements are used in the compound. The coating layer can be placed by a method which has no adverse effect (or has substantially no adverse effect) on the properties of the cathode active material. For example, the coating layer may be placed by methods such as spray coating, impregnating or the like.

In addition, the cathode active material may further include oxides, disulfides, chalcogenides, conductive polymers or the like. Examples of the oxides include titanium dioxide, vanadium oxide or manganese dioxide. Examples of the disulfides include titanium disulfide or molybdenum sulfide. Examples of the chalcogenides include niobium selenide. Examples of the conductive polymers include sulfur, polyaniline or polythiophene. However, the cathode active material is not limited to the above materials.

In some embodiments, the cathode may further include other materials as needed, for example, a cathode conductive agent.

The cathode conductive agent may be carbon materials, metal materials, conductive polymers, or the like. Any conductive material may be used as the conductive agent as long as it does not cause chemical changes in a battery.

Examples of the conductive agent include: carbon-based materials such as natural graphite, artificial graphite, carbon black, acetylene black, ketjen black, carbon fibers, carbon nanotubes, graphene, or the like; metal materials including metal powder or metal fibers containing one or more of copper, nickel, aluminum or silver; conductive polymers such as polyphenylene derivatives; or a mixture thereof.

Anode

The anode has an anode active material layer on one or two surfaces of an anode current collector. The anode active material layer may be one layer or multiple layers, wherein each of the multiple layers may have the same or different active materials.

The anode current collector may include a conductive material such as copper, nickel or stainless steel. The surface of the anode current collector can be further roughened to improve the adhesion to the active material. For example, an electrolyzed copper foil can be used. The anode active material layer includes an anode adhesive and an anode active material, and may further include other materials such as a conductive agent as needed. The anode active material is one or more anode materials capable of deintercalating lithium ions. The composition of the anode conductive agent is, for example, similar to the composition of the cathode conductive agent. However, the charge capacity of the anode material is preferably larger than the discharge capacity of the cathode in order to prevent lithium metal from being unintentionally precipitated on the anode during charging.

The anode active material includes one or more carbon materials. Specific examples of the carbon materials include graphitizable carbon, non-graphitizable carbon having d002≥0.37 nm, and graphite having d002≤0.34 nm. More specifically, examples of the carbon materials include pyrolytic carbon, coke, glassy carbon fibers, organic polymer compound calcined bodies, activated carbon or carbon black. Among the above, examples of coke include pitch coke, needle coke or oil coke. The organic polymer compound calcined body is obtained by calcining and carbonizing a polymer compound such as phenolic resin and furan resin at a suitable temperature. In addition, the carbon material may be low crystalline carbon or amorphous carbon which has been heat-treated at a temperature of about 1000° C. or lower. It should be noted that the carbon material may be in the shape of any of fibrous, spherical, granular, and scaly.

It should be noted that the anode active material layer may further include other kinds of anode active materials such as at least one of silicon materials, silicon carbon composite materials, silicon oxygen materials, alloy materials, or lithium-containing metal composite oxide materials, as long as the anode active material layer includes a carbon material as the anode active material. Examples of such other kinds of anode active materials include materials containing one or more metal elements and metalloid elements, capable of forming an alloy with Li, as constituent elements. Examples of the metal elements and the metalloid elements include Mg, B, Al, Ga, In, Si, Ge, Sn, Pb, Bi, Cd, Ag, Zn, Hf, Zr, Y, Pd, and Pt. In particular, Si, Sn, or a mixture thereof is used. Si and Sn have an excellent ability to deintercalate lithium ions and can provide high energy density. In addition, other anode active materials may be, for example, metal oxides, polymer compounds or the like. Examples of the metal oxides include iron oxide, ruthenium oxide or molybdenum oxide. Examples of the polymer compounds include polyacetylene, polyaniline or polypyrrole.

The anode adhesive includes hydroxyalkyl methylcellulose because the hydroxyalkyl methylcellulose has excellent adhesion and dispersibility to carbon materials. The hydroxyalkyl methylcellulose includes at least one of sodium hydroxyalkyl methylcellulose or lithium hydroxyalkyl methylcellulose, alkyl including methyl, ethyl, propyl or butyl. The anode adhesive may further include at least one of styrene butadiene rubber, fluorine rubber or ethylene propylene diene rubber.

Separator

The separator separates the cathode from the anode and allows lithium ions to pass while preventing a short circuit of current caused by contact of the two electrodes. The separator is a porous film made of, for example, synthetic resin, ceramic, or the like. The separator may be a laminate film wherein two or more porous films are laminated. Examples of the synthetic resin include polytetrafluoroethylene, polypropylene or polyethylene.

In some embodiments, the separator may include a base material layer (for example, the above porous film) and a polymer compound layer provided on one or two surfaces of the base material layer, thereby increasing the adhesion of the separator to the cathode and the anode, and suppressing the deflection of a wound electrode body. Further, the above separator can suppress the decomposition reaction of an electrolyte and suppress the liquid leakage of the electrolyte impregnated into the base material layer. Therefore, even if charge and discharge are repeated, the electric resistance of a secondary battery will not significantly increase, and the expansion of the battery can be suppressed.

In some embodiments, the polymer compound layer includes a polymer material, such as polyvinylidene fluoride, which has excellent physical strength and is electrochemically stable. In some embodiments, the polymer material may be a material other than polyvinylidene fluoride. In some embodiments, the polymer compound layer is formed by means of preparing a solution in which the polymer material is dissolved, coating the base material layer with the solution, and then drying the resulted product; or, by immersing the base material layer in the solution, and then drying it.

Electrolyte

1. Compound Having 2 to 3 Cyano Groups

In some embodiments, the electrochemical device of the present application includes an electrolyte comprising one or more compounds having 2 to 3 cyano groups. In some embodiments, the separator is impregnated with the electrolyte in the form of a liquid electrolyte.

In some embodiments, the compound having 2 to 3 cyano groups includes at least one of a dinitrile compound, a trinitrile compound, a dinitrile compound including an ether bond or a trinitrile compound including an ether bond.

According to the embodiments of the present application, the compound having 2 to 3 cyano groups includes succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptanedinitrile, 1,4-bis(cyanoethoxy)butane, diethylene glycol bis(2-cyanoethyl) ether, triethylene glycol bis(2-cyanoethyl)ether, tetraethylene glycol bis(2-cyanoethyl)ether, 1,3-bis(2-cyanoethoxy) propane, 1,4-bis(2-cyanoethoxy)butane, 1,5-bis(2-cyanoethoxy)pentane, ethylene glycol bis(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, 1,2,5-tris(cyanoethoxy)pentane or any combination thereof.

According to the embodiments of the present application, the compound having 2 to 3 cyano groups is contained in an amount of 0.01-15 wt % based on the total weight of the electrolyte. In some embodiments, the compound having 2 to 3 cyano groups is contained, based on the total weight of the electrolytic solution, in an amount of about 0.01 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, or any range therebetween.

In particular, in some embodiments, the electrolyte includes at least two compounds having 2 to 3 cyano groups. For example, the electrolyte may include at least two selected from succinonitrile (SN), adiponitrile (ADN), ethylene glycol bis(propionitrile)ether (EDN), 1,3,5-pentanetricarbonitrile, 1,2,3-propanetricarbonitrile, 1,3,6-hexanetricarbonitrile (HTCN), 1,2,6-hexanetricarbonitrile, 1,2,3-tris(2-cyanoethoxy)propane (TCEP) or 1,2,4-tris(2-cyanoethoxy)butane.

When these two or more compounds having 2 to 3 cyano groups are used in combination, the effect of improving the electrochemical characteristics in a high temperature or high voltage environment is further improved. Suitable combinations of these compounds having 2 to 3 cyano groups may be, for example, SN and ADN; SN and EDN; SN and HTCN; SN and TCEP; ADN and EDN; ADN and HTCN; ADN and TCEP; SN, ADN and HTCN; SN, END and HTCN; SN, TCEP and HTCN; ADN, END and HTCN; ADN, TCEP and HTCN; END, TCEP and HTCN, etc.

When the electrolyte including the compound having 2 to 3 cyano groups described in the present application is used in combination with the cathode including the adhesive described above, especially when the cathode adhesive includes a fluoropolymer having a diffraction peak in the range of $34°<2\theta<38°$ in the X-ray diffraction spectrum, a stable protective film can be formed on the surface of the cathode, thereby reducing the decomposition reaction of the electrolyte and suppressing the phenomenon of gas production of the electrochemical device after high temperature charging to avoid thickness swelling.

2. Additive A

In addition, the electrolyte may further include an additive A. The additive A includes at least one of cyclic carbonate containing a carbon-carbon double bond, a compound containing a sulfur-oxygen double bond, lithium difluorophosphate or lithium tetrafluoroborate.

In some embodiments, the additive A includes at least one of vinylethylene carbonate, ethylene vinyl ethylene carbonate, 1,3-propane sultone, ethylene sulfate, propylene sulfate, ethylene sulfite, methylene methanedisulfonate, lithium difluorophosphate or lithium tetrafluoroborate.

The additive A is contained, based on the total weight of the electrolyte, in an amount of about 0.01 wt % to about 5 wt %, for example, in an amount of about 0.01 wt %, about 0.05 wt %, about 0.1 wt %, about 0.5 wt %, about 1.0 wt %, about 1.5 wt %, about 2.0 wt %, about 2.5 wt %, about 3.0 wt %, or any range therebetween.

A. Cyclic Carbonate Containing Carbon-Carbon Double Bond

In particular, the additive A includes a cyclic carbonate containing a carbon-carbon double bond. The cyclic carbonate having a carbon-carbon double bond specifically includes, but is not limited to, vinylene carbonate, methyl vinylene carbonate, ethyl vinylene carbonate, ethylene vinyl ethylene carbonate, 1,2-dimethyl vinylene carbonate, 1,2-diethyl vinylene carbonate, fluorovinylene carbonate, trifluoromethyl vinylene carbonate; vinylethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate or 1,1-diethyl-2-methylene ethylene carbonate. In some embodiments, the cyclic carbonate having a carbon-carbon double bond includes one or more of those described above. In particular, in some embodiments, the additive is vinylene carbonate. Vinylene carbonate is easily available and provides better effects.

In some embodiments, the cyclic carbonate having a carbon-carbon double bond is contained in an amount of about 3 wt % or less. In some embodiments, the cyclic carbonate having a carbon-carbon double bond is contained in an amount of about 0.01 wt % to about 5 wt %, for example, in an amount of about 0.01 wt %, about 0.1 wt %, about 0.2 wt %, about 0.3 wt %, about 0.4 wt %, about 0.5 wt %, 1.0 wt %, 2.0 wt %, 3.0 wt %, 4.0 wt %, 5.0 wt %, or any range therebetween.

B. Compound Containing Sulfur-Oxygen Double Bond

In some embodiments, the additive A may include a compound containing a sulfur-oxygen double bond. The compound containing a sulfur-oxygen double bond includes at least one of cyclic sulfate, linear sulfate, linear sulfonate, cyclic sulfonate, linear sulfite or cyclic sulfite.

In some embodiments, the cyclic sulfate includes, but is not limited to, one or more selected from the following compounds: vinyl sulfate, 1,2-propanediol sulfate, 1,3-propanediol sulfate, 1,2-butanediol sulfate, 1,3-butanediol sulfate, 1,4-butanediol sulfate, 1,2-pentanediol sulfate, 1,3-pentanediol sulfate, 1,4-pentanediol sulfate, and 1,5-pentanediol sulfate.

In some embodiments, the linear sulfate includes, but is not limited to, one or more compounds selected from the following compounds: dimethyl sulfate, ethyl methyl sulfate, and diethyl sulfate.

In some embodiments, the linear sulfonate includes, but is not limited to, one or more selected from following compounds: fluorosulfonate such as methyl fluorosulfonate and ethyl fluorosulfonate, methyl methanesulfonate, ethyl methanesulfonate, dibutyl methanesulfonate, methyl 2-(methylsulfonyloxy)propionate, and ethyl 2-(methylsulfonyloxy)propionate.

In some embodiments, the cyclic sulfonate includes, but is not limited to, one or more selected from the following compounds: 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3- sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methane disulfonate, and ethylene methane disulfonate.

In some embodiments, the linear sulfite includes, but is not limited to, one or more selected from the following compounds: dimethyl sulfite, ethyl methyl sulfite, and diethyl sulfite.

In some embodiments, the cyclic sulfite specifically includes, but is not limited to, one or more selected from the following compounds: 1,2-ethanediol sulfite, 1,2-propanediol sulfite, 1,3-propanediol sulfite, 1,2-butanediol sulfite, 1,3-butanediol sulfite, 1,4-butanediol sulfite, 1,2-pentanediol sulfite, 1,3-pentanediol sulfite, 1,4-pentanediol sulfite, and 1,5-pentanediol sulfite.

In some embodiments, the compound containing a sulfur-oxygen double bond is contained in an amount of about 0.01 wt % to about 5 wt %. In some embodiments, the compound containing a sulfur-oxygen double bond is contained in an amount of, for example, about 0.01 wt %, about 0.1 wt %, about 0.2 wt %, about 0.3 wt %, about 0.4 wt %, about 0.5 wt %, about 1.0 wt %, about 2.0 wt %, about 3.0 wt %, about 4.0 wt %, about 5.0 wt %, or any range therebetween.

C. Lithium Difluorophosphate and/or Lithium Tetrafluoroborate

In some embodiments, the additive A includes at least one of lithium difluorophosphate and lithium tetrafluoroborate. The lithium difluorophosphate or the lithium tetrafluoroborate is contained, based on the total weight of the electrolyte, in an amount of about 0.01 wt % to about 5 wt %, for example, about 0.01 wt %, about 0.1 wt %, about 0.5 wt %, about 1.0 wt %, about 2.0 wt %, about 3.0 wt %, about 4.0 wt %, about 5.0 wt %, or any range therebetween.

3. Polynuclear Molybdenum Cluster Ionic Liquid

The electrolyte of the present application may further include a polynuclear molybdenum cluster ionic liquid as described above. In some embodiments, the polynuclear molybdenum cluster ionic liquid is contained, based on the total weight of the electrolyte, in an amount of about 0.01 wt % to about 5 wt %, for example, about 0.01 wt %, about 0.1 wt %, about 0.5 wt %, about 1.0 wt %, about 2.0 wt %, about 3.0 wt %, about 4.0 wt %, about 5.0 wt %, or any range therebetween.

4. Lithium Salt

The electrolyte may include, for example, one or more salts such as a lithium salt. However, the electrolyte may include, for example, a salt other than the lithium salt (for example, a light metal salt other than the lithium salt).

The electrolyte of the present application is not limited, and it may be any electrolyte known in the prior art. In some embodiments, the electrolyte includes, but is not limited to: an inorganic lithium salt, such as $LiClO_4$, $LiAsF_6$, $LiPF_6$, $LiBF_4$, $LiSbF_6$, $LiSO_3F$, $LiN(FSO_2)_2$, etc.; a fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, cyclic lithium 1,3-hexafluoropropane disulfonimide, cyclic lithium 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, etc.; and a lithium salt containing a dicarboxylic acid complex, such as lithium bis(oxalate)borate, lithium difluorooxalate borate, lithium tris(oxalate)phosphate, lithium difluoro bis(oxalate)phosphate, lithium tetrafluoro(oxalate)phosphate, etc. In some embodiments, the electrolyte includes one or more of those described above. In some embodiments, the electrolyte includes $LiPF_6$ and $LiBF_4$. In some embodiments, the electrolyte includes the combination of inorganic lithium salts such as $LiPF_6$, $LiBF_4$ or the like, and fluorine-containing organic lithium salts such as $LiCF_3SO_3$, $LiN(CF_3SO_2)_2$, $LiN(C_2F_5SO_2)_2$ or the like. In some embodiments, the electrolyte has a concentration in a range of about 0.8 mol/L to about 3 mol/L, for example, in a range of about 0.8 mol/L to about 2.5 mol/L, in a range of about 0.8 to about 2 mol/L, or in a range of or about 1 to about 2 mol/L, and for another example, being 1 mol/L, 1.15 mol/L, 1.2 mol/L, 1.5 mol/L, 2 mol/L, or 2.5 mol/L.

5. Solvent

The solvent used in the electrolyte of the present application may be any non-aqueous solvent known in the art that can be used as a solvent of electrolyte.

In some embodiments, the non-aqueous solvent includes, but is not limited to, cyclic carbonate, linear carbonate, cyclic carboxylate, linear carboxylate, cyclic ether, linear ether, a phosphorus-containing organic solvent, a sulfur-containing organic solvent, and an aromatic fluorine-containing solvent.

In some embodiments, the cyclic carbonate includes, but is not limited to, ethylene carbonate (EC), propylene carbonate (PC), and butylene carbonate. In some embodiments, the cyclic carbonate has 3-6 carbon atoms.

In some embodiments, the linear carbonate includes, but is not limited to, dimethyl carbonate, ethyl methyl carbonate, diethyl carbonate (DEC), methyl n-propyl carbonate, ethyl n-propyl carbonate, di-n-propyl carbonate or other linear carbonates as fluorine-substituted linear carbonate, such as bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

In some embodiments, the cyclic carboxylate includes, but is not limited to, γ-butyrolactone and γ-valerolactone. In some embodiments, a portion of hydrogen atoms of the cyclic carboxylate may be substituted with fluorine.

In some embodiments, the linear carboxylate includes, but is not limited to, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, a portion of hydrogen atoms of the linear carboxylate may be substituted with fluorine. In some embodiments, the fluorine-substituted linear carboxylate includes, but is not limited to, methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyltetrahydrofuran, 1,3-dioxolane, 2-methyl 1,3-dioxolane, 4-methyl 1,3-dioxolane, 1,3-dioxane, 1,4-dioxane, and dimethoxypropane.

In some embodiments, the linear ether includes, but not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the phosphorus-containing organic solvent includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3-pentafluoropropyl)phosphate.

In some embodiments, the sulfur-containing organic solvent includes, but is not limited to, sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, a portion of hydrogen atoms of the sulfur-containing organic solvent may be substituted with fluorine.

In some embodiments, the aromatic fluorine-containing solvent includes, but is not limited to, fluorobenzene, difluorobenzene, trifluorobenzene, tetrafluorobenzene, pentafluorobenzene, hexafluorobenzene, and trifluoromethylbenzene.

In some embodiments, the solvent used in the electrolyte of the present application includes one or more of those described above. In some embodiments, the solvent used in the electrolyte of the present application includes cyclic carbonate, linear carbonate, cyclic carboxylate, linear carboxylate, and a combination thereof. In some embodiments, the solvent used in the electrolyte of the present application includes an organic solvent selected from the group consisting of ethylene carbonate, propylene carbonate, diethyl carbonate, ethyl propionate, propyl propionate, n-propyl acetate, ethyl acetate, and a combination thereof. In some embodiments, the solvent used in the electrolyte of the present application includes: ethylene carbonate, propylene carbonate, diethyl carbonate, ethyl propionate, propyl propionate, γ-butyrolactone, or a combination thereof.

After linear carboxylate and/or cyclic carboxylate is added to the electrolyte of the present application, the linear carboxylate and/or the cyclic carboxylate can form a passivation film on the surface of an electrode, thereby improving the capacity retention ratio of the electrochemical device after intermittent charging cycle. In some embodiments, the electrolyte of the present application includes linear carboxylate, cyclic carboxylate, or a combination thereof in an amount of about 1 wt % to about 60 wt %. In some embodiments, the electrolyte of the present application includes ethyl propionate, propyl propionate, γ-butyrolactone, or a combination thereof in an amount of about 1 wt % to about 60 wt %, about 10 wt % to about 60 wt %, about 10 wt % to about 50 wt % or about 20 wt % to about 50 wt %. In some embodiments, the electrolyte of the present application includes propyl propionate in an amount of about 1 wt % to about 60 wt %, about 10 wt % to about 60 wt %, about 20 wt % to about 50 wt %, about 20 wt % to about 40 wt %, or about 30 wt %.

The electrochemical device of the present application includes any device that undergoes an electrochemical reaction, and specific examples thereof include all kinds of primary batteries, secondary batteries, fuel cells, solar cells or capacitors. In particular, the electrochemical device is a lithium secondary battery, including a lithium metal secondary battery, a lithium-ion secondary battery, or a lithium-ion polymer secondary battery. In some embodiments, the electrochemical device of the present application includes a cathode having a cathode active material capable of occluding and releasing metal ions, an anode having an anode active material capable of occluding and releasing metal ions, and the electrolyte of the present application.

The electrochemical device fabricated from the cathode and the electrolyte described in the present application is suitable for use in electronic equipment in various fields.

The use of the electrochemical device of the present application is not particularly limited. The electrochemical device can be used for various known applications, such as notebook computers, pen input computers, mobile computers, e-book players, portable telephones, portable fax machines, portable copy machines, portable printers, headset stereo headphones, VCRs, LCD TVs, portable cleaners, portable CD players, mini disc players, transceivers, electronic notebooks, calculators, memory cards, portable recorders, radios, backup power supplies, motors, cars, motorcycles, power bicycles, bicycles, lighting fixtures, toys, game consoles, clocks, electric power tools, flashlights, cameras, large household batteries, or lithium ion capacitors, etc.

EXAMPLES

The embodiments of the present application will be exemplified below in conjunction with examples. It should be understood that the examples are only intended to illustrate the present application and are not intended to limit the protection scope of the present application.

1. Preparation Method (1) Preparation of Anode:

Graphite, styrene butadiene rubber and carboxymethyl cellulose were mixed in a mass ratio of about 96:2:2 in a solvent of deionized water and stirred uniformly to obtain an anode slurry. The slurry was coated on a copper foil having a thickness of about 12 μm. The coated copper foil was dried, cold pressed, cut, and then soldered with tabs to obtain an anode.

(2) Preparation of Cathode:

Lithium cobalt oxide ($LiCoO_2$), carbon nanotubes (CNTs) and a fluoropolymer were mixed in a mass ratio of about 95:2:3 in a solvent of N-methylpyrrolidone and stirred uniformly to obtain a cathode slurry. The slurry was coated on an aluminum foil having a thickness of about 12 μm. The coated aluminum foil was dried, cold pressed, cut, and soldered with tabs to obtain a cathode.

Preparation of Fluoropolymer

PVDF-1A and preparation thereof: A 25 L closed polymerization reactor arranged with stir was purged with nitrogen to remove oxygen such that the oxygen content in the reactor was less than 20 ppm. 12 Kg of deionized water, 100 g of ammonium perfluorohexanoate solution having a concentration of 5%, 50 g of paraffin, 2.2 g of dicyclohexyl peroxydicarbonate, 40 g of diethyl carbonate, and 2.5 Kg of vinylidene fluoride (VDF) were added. The reactor was raised to a temperature of 50° C. The stirring speed was adjusted to 200 rpm, and kept for 1 hour, followed by slowly adding 4.5 Kg of vinylidene fluoride to maintain the pressure at about 5 MPa. Meanwhile, 12 g of diethyl carbonate was added 3 times at an interval of 40 min. After each completion of the addition, the temperature was kept for polymerization for 2 hours, the reaction was carried out until the pressure of the reactor was lowered to 4 MPa, and then the gas was discharged and the product was collected. The fluoropolymer was dried after wax removal, coagulation demulsification, and dehydration. The dried fluoropolymer PVDF-1A was sampled for analysis tests.

Figure 1:
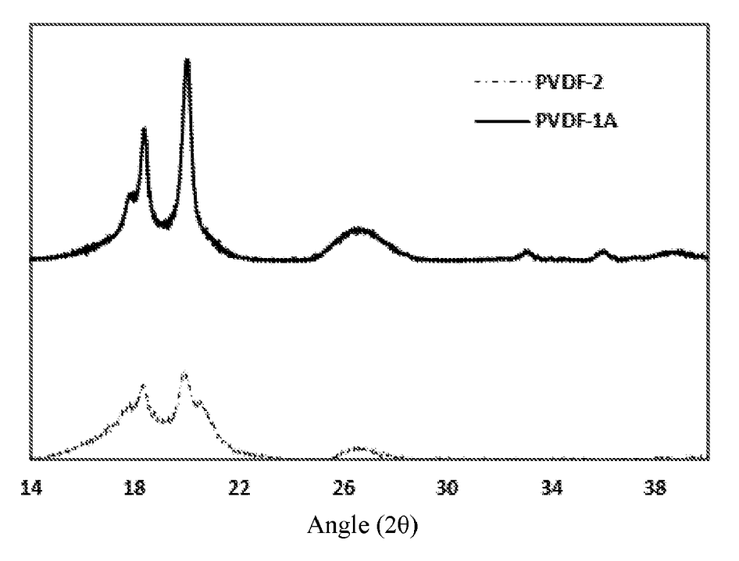
FIG. 1 is an X-ray diffraction pattern of fluoropolymers PVDF-1A and PVDF-2.

The test result of PVDF-1A was as follows: it has an intrinsic viscosity of 155 ml/g (DMAC solution, 25° C.), a weight-average molecular weight of 912,000, a molecular weight distribution coefficient of Mw/Mn=2.2, and a melting point of 161° C. A diffraction peak at 2θ=36.1° exists in the X-ray diffraction spectrum as shown in FIG. 1.

PVDF-1A having a different content of the Si element can be obtained by adjusting the content of Si in the raw material of vinylidene fluoride (VDF). The content of the Si element in the fluoropolymer PVDF-1A was measured by ICP. The content of the Si element in PVDF-1A used in illustrative Table 1 to Table 2, and Table 5 to Table 6 was 30 ppm.

PVDF-1B to PVDF-1J: The preparation method is the same as PVDF-1A, except that dicyclohexyl peroxydicarbonate is used in different amounts. The test results are shown as the table below

| Names | Initiator amount (g) | Molecular weight distribution coefficient | 2θ |
|---|---|---|---|
| PVDF-1B | 1.0 | 2.0 | 36.1° |
| PVDF-1C | 1.2 | 2.1 | 36.1° |
| PVDF-1D | 1.4 | 2.5 | 36.2° |
| PVDF-1E | 1.6 | 2.8 | 36.3° |
| PVDF-1F | 1.8 | 3.2 | 36.5° |
| PVDF-1G | 2.0 | 3.5 | 36.6° |
| PVDF-1H | 2.1 | 4 | 36.7° |
| PVDF-1I | 2.5 | 4.2 | 36.8° |
| PVDF-1J | 0.8 | 1.8 | 35.8° |

PVDF-2: A conventional commercially available PVDF having no diffraction peak in the range of 34°<2θ<38°.

PVDF-3: A conventional commercially available PVDF-HFP having no diffraction peak in the range of 34°<2θ<38°.

(3) Preparation of Electrolyte

Under a dry argon atmosphere, EC, PC and DEC (in a weight ratio of about 1:1:1) were mixed, and $LiPF_6$ was added and mixed uniformly to form a base electrolyte, wherein the concentration of $LiPF_6$ was 1.15 mol/L. Other additives were added to the base electrolyte to obtain different examples of electrolytes.

(4) Preparation of Separator

A PE porous polymer film was used as the separator.

(5) Preparation of Lithium Ion Battery

The obtained cathode, anode and separator were wound in order and placed in an outer package with a liquid injection inlet reserved. The electrolyte was injected into the liquid injection inlet, encapsulated, and then was subjected to processes such as formation and capacity to obtain lithium-ion battery.

The English abbreviations for the chemical substances used in the examples of the present application are shown in the table below:

| Material name | Abbreviation | Material name | Abbreviation |
|---|---|---|---|
| Ethylene carbonate | EC | 1,3-propane sultone | PS |
| Propylene carbonate | PC | Vinyl sulfate | DTD |
| Ethyl propionate | EP | Succinonitrile | SN |
| Propyl propionate | PP | Adiponitrile | ADN |
| Vinylene carbonate | VC | 1,3,6-hexanetricarbonitrile | HTCN |
| Lithium tetrafluoroborate | $LiBF_4$ | Ethylene glycol bis(2-cyanoethyl)ether | EDN |
| Lithium difluorophosphate | $LiPO_2F_2$ | 1,2,3-tris(2-cyanoethoxy)propane | TCEP |
| Lithium hexafluorophosphate | $LiPF_6$ | | |

2. Test Methods (1) The Method for Testing High Temperature Storage Properties of the Lithium-Ion Battery The lithium-ion battery was allowed to stand at 25° C. for 30 minutes, charged at a constant current with the rate of 0.5 C to 4.45 V, then charged at a constant voltage of 4.45 V to 0.05 C, allowed to stand for 5 minutes, and then stored at 60° C. for 21 days, then the thickness of the battery was measured. The thickness swelling rate was calculated by the following formula:

Thickness swelling rate=[(thickness after storage−thickness before storage)/thickness before storage]×100%.

(2) The Method for Testing Capacity Retention Ratio of the Lithium-Ion Battery

The lithium-ion battery was charged to 4.45 V at a constant current of 1 C at 45° C., charged to a current of 0.05 C at a constant voltage, and then discharged to 3.0 V with a constant current of 1 C, which was the first cycle. The lithium-ion battery was subjected to a plurality of cycles under the above conditions. The capacity retention ratio after 400 cycles was calculated.

The capacity retention ratio after cycling was calculated as follows:

Capacity retention ratio after cycle=(discharge capacity after corresponding cycle/discharge capacity after first cycle)×100%.

Examples using and without using the cathode adhesive and the electrolyte according to the present application, as well as performance test results thereof, are provided in Table 1.

TABLE 1

| | | Compound having 2 to 3 cyano groups | | | | | |
|---|---|---|---|---|---|---|---|
| Example | Fluoropolymer | Dinitrile (3 wt %) | Trinitrile (2 wt %) | Ether dinitrile (1 wt %) | Ether trinitrile (3 wt %) | Thickness swelling rate (%) | Capacity retention ratio (%) |
| 1-1 | PVDF-1A | — | — | — | — | 20.6 | 56.9 |
| 1-2 | | SN | — | — | — | 9.1 | 75.1 |
| 1-3 | | ADN | — | — | — | 8.6 | 78.8 |
| 1-4 | | — | HTCN | — | — | 6.2 | 81.2 |
| 1-5 | | — | — | EDN | — | 7.5 | 82.2 |
| 1-6 | | — | — | — | TCEP | 5.3 | 85.6 |
| 1-7 | PVDF-1A | SN + ADN | — | — | — | 8.1 | 79.5 |
| 1-8 | | SN | HTCN | — | — | 5.3 | 82.3 |
| 1-9 | | SN | — | EDN | — | 5.5 | 83.2 |
| 1-10 | | SN | — | — | TCEP | 4.9 | 83.5 |
| 1-11 | | ADN | HTCN | — | — | 5.1 | 83.1 |

TABLE 1-continued

| Example | Fluoropolymer | Dinitrile (3 wt %) | Trinitrile (2 wt %) | Ether dinitrile (1 wt %) | Ether trinitrile (3 wt %) | Thickness swelling rate (%) | Capacity retention ratio (%) |
|---|---|---|---|---|---|---|---|
| 1-12 | | ADN | — | EDN | — | 6.2 | 82.3 |
| 1-13 | | ADN | — | — | TCEP | 3.8 | 85.5 |
| 1-14 | | ADN | — | — | — | 3.6 | 82.1 |
| 1-15 | PVDF-1A | SN + ADN | HTCN | — | — | 4.3 | 83.9 |
| 1-16 | | SN + ADN | — | EDN | — | 5.6 | 83 |
| 1-17 | | SN + ADN | — | — | TCEP | 3.0 | 86.3 |
| 1-18 | | ADN | HTCN | EDN | — | 3.8 | 84.4 |
| 1-19 | | ADN | HTCN | — | TCEP | 3.3 | 86 |
| 1-20 | | — | HTCN | EDN | — | 4.2 | 84.8 |
| 1-21 | | — | HTCN | — | TCEP | 3.1 | 86.4 |
| 1-22 | | — | HTCN | EDN | TCEP | 2.5 | 86.5 |
| 1-23 | PVDF-2 | SN | — | — | — | 20.2 | 58.1 |
| 1-24 | | ADN | — | — | — | 21.3 | 57.4 |
| 1-25 | | — | HTCN | — | — | 17.4 | 59.9 |
| 1-26 | | — | — | EDN | — | 19 | 51.2 |
| 1-27 | | — | — | — | TCEP | 17.1 | 54.3 |
| 1-28 | | SN | HTCN | — | — | 15.3 | 60.2 |
| 1-29 | | ADN | — | — | — | 19.6 | 58.2 |
| 1-30 | | — | — | — | — | 35.9 | 45.7 |
| 1-31 | PVDF-3 | — | — | — | — | 36.8 | 43.2 |
| 1-32 | | SN | — | — | — | 24.3 | 53.5 |
| 1-33 | | ADN | — | — | — | 26.2 | 51.1 |
| 1-34 | | — | HTCN | — | — | 16.3 | 56.5 |

* When SN and ADN were added at the same time, their contents were: 1 wt % for SN, and 2 wt % for ADN.

As can be seen from the data in Table 1 above, the kind of the cathode adhesive and the type of the compound having 2 to 3 cyano groups in the electrolyte have advantageous influences on the characteristics of the electrochemical device.

When the cathode adhesive is a fluoropolymer having an X-ray diffraction spectrum with a diffraction peak in the range of $34°<2\theta<38°$ and the electrolyte includes the compound having 2 to 3 cyano groups, 2 to 3the cycle capacity retention ratio is remarkably increased, and the high temperature storage thickness swelling rate is remarkably reduced compared with the case where the electrolyte does not include the compound having 2 to 3 cyano groups. In particular, when trinitrile or ether trinitrile compound is added to the electrolyte, a high cycle retention ratio and a low thickness swelling rate can be further obtained. This is because the fluoropolymer and the compound having 2 to 3 cyano groups synergistically form an effective protection film on the surface of the cathode material, such that the interface between the cathode and the electrolyte are thereby stabilized, the decomposition of the electrolyte is suppressed, the thickness swelling of the battery is reduced, and the capacity retention ratio is increased.

Table 2 provides examples using different amounts of compounds having 2 to 3 cyano groups, and their tested properties.

TABLE 2

| Example | Fluoropolymer | SN | ADN | HTCN | EDN | TCEP | Thickness swelling rate (%) | Capacity retention ratio (%) |
|---|---|---|---|---|---|---|---|---|
| 2-1 | PVDF-1A | 2 | — | — | — | — | 10.3 | 73.1 |
| 2-2 | | 4 | — | — | — | — | 8.5 | 75.6 |
| 2-3 | | 6 | — | — | — | — | 7.2 | 74.3 |
| 2-4 | | — | 2 | — | — | — | 9.7 | 75.3 |
| 2-5 | | — | 4 | — | — | — | 8.1 | 78.3 |
| 2-6 | | — | 6 | — | — | — | 6.5 | 71.2 |
| 1-4 | | — | — | 2 | — | — | 6.2 | 81.2 |
| 2-7 | | — | — | 4 | — | — | 5.8 | 79.3 |
| 2-8 | | — | — | 6 | — | — | 4.5 | 76.2 |
| 2-9 | | — | — | — | 2 | — | 8.5 | 76.5 |
| 2-10 | | — | — | — | 4 | — | 6.8 | 79.5 |
| 2-11 | | — | — | — | 6 | — | 4.9 | 76.4 |
| 2-12 | | — | — | — | — | 2 | 5.4 | 83.2 |
| 2-13 | | — | — | — | — | 4 | 5.1 | 81.3 |
| 2-14 | | — | — | — | — | 6 | 3.9 | 80.3 |
| 2-15 | | 4 | — | 2 | — | — | 5 | 73.1 |
| 2-16 | | 4 | — | 4 | — | — | 3.3 | 71.3 |
| 2-17 | | 6 | — | 2 | — | — | 3.2 | 73.2 |
| 2-18 | | 6 | — | 4 | — | — | 3.1 | 68.1 |
| 2-19 | | 6 | — | — | — | 4 | 2.8 | 73.5 |
| 2-20 | | | | | | 0.01 | 19.7 | 60.5 |
| 2-21 | | | | | | 0.1 | 15.6 | 62.1 |

TABLE 2-continued

| | | | | | | | Compound having 2 to 3 cyano groups | | |
|---|---|---|---|---|---|---|---|---|---|
| Example | Fluoropolymer | SN | ADN | HTCN | EDN | TCEP | | Thickness swelling rate (%) | Capacity retention ratio (%) |
| 2-22 | | | | | | 5 | | 4.7 | 81.2 |
| 2-23 | | | | | | 7 | | 4.5 | 80.8 |
| 2-24 | | | | | | 10 | | 5.6 | 77.3 |
| 2-25 | | | | | | 15 | | 5.8 | 65.2 |

As can be seen from the data in Table 2, when electrolytes including different amounts of compounds having 2 to 3 cyano groups were used, they all achieve high cycle retention ratio and low thickness swelling rate. In particular, when the compound having 2 to 3 cyano groups was contained in an amount of about 0.01 wt % D to about 15 wt % based on the total weight of the electrolyte, better effects can be obtained.

In particular, in some examples, combinations of compounds having 2 to 3 cyano groups in the present application, for example, SN and ADN, SN and EDN, SN and HTCN, SN and TCEP, ADN and EDN, ADN and HTCN, ADN and TCEP, SN, ADN and HTCN, SN, END and HTCN, SN, TCEP and HTCN, ADN, END and HTCN, ADN, TCEP and HTCN, as well as END, TCEP and HTCN were used, and better synergy effects can be obtained.

Table 3 below provides examples using PVDF with different molecular weight distributions, and their tested properties.

TABLE 3

| | | Compound having 2 to 3 cyano groups | | | | | |
|---|---|---|---|---|---|---|---|
| Example | Fluoropolymer | Dinitrile (3 wt %) | Trinitrile (2 wt %) | Ether dinitrile (1 wt %) | Ether trinitrile (3 wt %) | Thickness swelling rate (%) | Capacity retention ratio (%) |
| 3-1 | PVDF-1B | SN | — | — | — | 10.3 | 73.1 |
| 3-2 | | — | HTCN | — | — | 6.2 | 81.2 |
| 3-3 | | — | — | EDN | — | 8.5 | 76.5 |
| 3-4 | | — | — | — | TCEP | 5.4 | 83.2 |
| 3-5 | PVDF-1C | SN | — | — | — | 10 | 73.4 |
| 3-6 | | — | HTCN | — | — | 5.9 | 81.5 |
| 3-7 | | — | — | EDN | — | 8.2 | 76.8 |
| 3-8 | | — | — | — | TCEP | 5.1 | 83.5 |
| 3-9 | PVDF-1D | SN | — | — | — | 9.8 | 73.6 |
| 3-10 | | — | HTCN | — | — | 5.7 | 81.7 |
| 3-11 | | — | — | EDN | — | 8 | 77 |
| 3-12 | | — | — | — | TCEP | 4.9 | 83.7 |
| 3-13 | PVDF-1E | SN | — | — | — | 9.5 | 73.9 |
| 3-14 | | — | HTCN | — | — | 5.4 | 82 |
| 3-15 | | — | — | EDN | — | 7.7 | 77.3 |
| 3-16 | | — | — | — | TCEP | 4.6 | 84 |
| 3-17 | PVDF-1F | SN | — | — | — | 9.1 | 75.1 |
| 3-18 | | — | HTCN | — | — | 6.2 | 81.2 |
| 3-19 | | — | — | EDN | — | 7.5 | 82.2 |
| 3-20 | | — | — | — | TCEP | 5.3 | 85.6 |
| 3-21 | PVDF-1G | SN | — | — | — | 10.3 | 73.9 |
| 3-22 | | — | HTCN | — | — | 6.2 | 81.7 |
| 3-23 | | — | — | — | TCEP | 5.4 | 82.6 |
| 3-24 | PVDF-1H | — | HTCN | — | — | 7.3 | 79.6 |
| 3-25 | | — | — | — | TCEP | 6.5 | 80.8 |
| 3-26 | | SN | — | — | — | 6.8 | 73.5 |
| 3-27 | PVDF-1I | — | HTCN | — | — | 11.4 | 65.4 |
| 3-28 | | — | — | — | TCEP | 9.8 | 67 |
| 3-29 | | SN | — | — | — | 7.5 | 61.8 |
| 3-30 | PVDF-1J | — | HTCN | — | — | 8.3 | 63.1 |
| 3-31 | | — | — | — | TCEP | 6.5 | 65.3 |

As can be seen from the data in Table 3, the adhesives with different molecular weight distributions used in the present application can all achieve high cycle retention ratios and low thickness swelling rates. In particular, when PVDF has a molecular weight distribution coefficient of $2 \leq Mz/Mw \leq 4$, better effects can be obtained.

Table 4 below provides examples using PVDF-1A having different silicon contents, and their tested properties.

| Example | Fluoropolymer | Si content (ppm) | Dinitrile (3 wt %) | Trinitrile (2 wt %) | Ether dinitrile (1 wt %) | Ether trinitrile (3 wt %) | Thickness swelling rate (%) | Capacity retention ratio (%) |
|---|---|---|---|---|---|---|---|---|
| 4-1 | PVDF-1A | 100 | SN | — | — | — | 9.1 | 75.1 |
| 4-2 | | | — | HTCN | — | — | 6.2 | 81.2 |
| 4-3 | | | — | — | EDN | — | 7.5 | 82.2 |
| 4-4 | | | — | — | — | TCEP | 5.3 | 85.6 |
| 4-5 | | 80 | SN | — | — | — | 8.6 | 75.8 |
| 4-6 | | | — | HTCN | — | — | 5.4 | 82.2 |
| 4-7 | | | — | — | EDN | — | 6.9 | 82.9 |
| 4-8 | | | — | — | — | TCEP | 4.9 | 86.3 |
| 4-9 | | 70 | SN | — | — | — | 8.2 | 76.7 |
| 4-10 | | | — | HTCN | — | — | 5.1 | 83.2 |
| 4-11 | | | — | — | EDN | — | 6.5 | 84.4 |
| 4-12 | | | — | — | — | TCEP | 4.3 | 88.1 |
| 4-13 | | 50 | SN | — | — | — | 7.4 | 77.4 |
| 4-14 | | | — | HTCN | — | — | 4.3 | 83.9 |
| 4-15 | | | — | — | EDN | — | 5.7 | 85.1 |
| 4-16 | | | — | — | — | TCEP | 3.5 | 88.8 |
| 4-17 | | 150 | SN | — | — | — | 14.5 | 65.2 |
| 4-18 | | | — | HTCN | — | — | 11.9 | 69.3 |
| 4-19 | | | — | — | EDN | — | 12.4 | 70.2 |
| 4-20 | | | — | — | — | TCEP | 9.8 | 73.5 |
| 4-21 | | 200 | SN | — | — | — | 15.7 | 63.3 |
| 4-22 | | | — | HTCN | — | — | 13.1 | 67.4 |
| 4-23 | | | — | — | EDN | — | 13.6 | 68.3 |
| 4-24 | | | — | — | — | TCEP | 11.3 | 71.6 |

As can be seen from the data in Table 4, high cycle retention ratios can be achieved in all the cases using fluoropolymers having different silicon contents. In particular, when the Si content is less than 100 ppm, further improved cycle retention ratios and reduced thickness swelling rates were obtained.

Table 5 provides examples having different electrolytes, and their tested properties.

At least one additive selected from the following was used in the below examples: cyclic carbonate containing a carbon-carbon double bond, a compound containing a sulfur-oxygen double bond, lithium difluorophosphate and lithium tetrafluoroborate. Specific compounds are as follows: VC, PS, DTD, $LiBF_4$, and $LiPO_2F_2$.

TABLE 5

| Example | Fluoropolymer | Electrolyte (the additive is present in wt %) | | | | | | | | Thickness swelling rate (%) | Capacity retention ratio (%) |
| | | SN | HTCN | TCEP | VC | PS | DTD | $LiBF_4$ | $LiPO_2F_2$ | | |
|---|---|---|---|---|---|---|---|---|---|---|---|
| 5-1 | PVDF-1A | 4 | — | — | 0.5 | — | — | — | — | 7.5 | 80.4 |
| 5-2 | | 4 | — | — | — | 3 | — | — | — | 6.5 | 78.9 |
| 5-3 | | 4 | — | — | — | — | — | 0.2 | — | 7.3 | 81.8 |
| 5-4 | | 4 | — | — | — | — | 0.5 | — | — | 7.9 | 81.6 |
| 5-5 | | 4 | — | — | — | — | — | — | 0.1 | 6.8 | 83.2 |
| 5-6 | | — | 2 | — | 0.5 | — | — | — | — | 6.3 | 81.7 |
| 5-7 | | — | 2 | — | — | 3 | — | — | — | 5.3 | 82.2 |
| 5-8 | | — | 2 | — | — | — | — | 0.2 | — | 6.1 | 83.1 |
| 5-9 | | — | 2 | — | — | — | 0.5 | — | — | 5.7 | 82.9 |
| 5-10 | | — | 2 | — | — | — | — | — | 0.1 | 5.6 | 84.5 |
| 5-11 | | — | — | 2 | 0.5 | — | — | — | — | 5.7 | 83.4 |
| 5-12 | | — | — | 2 | — | 3 | — | — | — | 3.7 | 84.9 |
| 5-13 | | — | — | 2 | — | — | — | 0.2 | — | 4.5 | 84.8 |
| 5-14 | | — | — | 2 | — | — | — | — | 0.1 | 5.1 | 84.6 |
| 5-15 | | 4 | 2 | — | 0.2 | 3 | — | — | — | 5.7 | 85.3 |
| 5-16 | | 4 | 2 | — | 0.2 | 3 | — | 0.2 | — | 4.8 | 87.5 |
| 5-17 | | — | 2 | — | 0.2 | 3 | — | 0.2 | — | 4.5 | 88.1 |
| 5-18 | | — | — | 3 | 0.2 | 3 | — | — | — | 4.4 | 87.8 |
| 5-19 | | — | — | 3 | — | 3 | — | 0.2 | — | 4.6 | 87.2 |
| 5-20 | | — | — | 3 | — | 3 | — | — | 0.1 | 4.8 | 86.9 |
| 5-21 | | 4 | — | 3 | — | — | — | — | 0.1 | 5.5 | 85.8 |
| 5-22 | | 4 | — | 3 | — | 3 | — | — | — | 3.8 | 84.3 |
| 5-23 | | 4 | — | 3 | 5 | — | — | — | — | 5.3 | 85.5 |
| 5-24 | | 4 | — | 3 | 0.01 | — | — | — | — | 4.9 | 76.9 |

As can be seen from the above data, when the electrolyte included at least one of VC, PS, DTD, $LiBF_4$ or $LiPO_2F_2$, the electrochemical device of the present application can further achieve a high cycle retention ratio and a low thickness swelling rate. In particular, in some examples, the cyclic retention ratio was further increased and the thickness swelling rate was further reduced when the combinations of two or more compounds were added.

Table 6 below provides examples comprising a cathode or an electrolyte with or without a polynuclear molybdenum cluster ionic liquid.

TABLE 6

| | | Cathode | | | | Electrolyte | | |
|---|---|---|---|---|---|---|---|---|
| Example | Fluoropolymer | $[C_{16}H_{33}$-methylimidazole$]_2$ $[Mo_6O_{19}]$ (wt %) | SN (wt %) | HTCN (wt %) | TCEP (wt %) | $[C_{16}H_{33}$-methylimidazole$]_2$ $[Mo_6O_{19}]$ (wt %) | Thickness swelling rate (%) | Capacity retention ratio (%) |
| 6-1 | PVDF-1A | 0.01 | — | — | — | — | 18.3 | 56.9 |
| 6-2 | | 0.2 | — | — | — | — | 13.2 | 64.2 |
| 6-3 | | 0.2 | 3 | — | — | — | 7.5 | 79.6 |
| 6-4 | | 0.2 | — | 3 | — | — | 6.1 | 81.5 |
| 6-5 | | 0.2 | — | — | 3 | — | 4.3 | 88.9 |
| 6-6 | | 0.5 | 3 | — | — | — | 6.3 | 80.4 |
| 6-7 | | 0.5 | — | 3 | — | — | 4.9 | 82.3 |
| 6-8 | | 0.5 | — | — | 3 | — | 3.1 | 89.7 |
| 6-9 | | 2 | — | — | — | — | 10.8 | 66.9 |
| 6-10 | | 2 | — | — | 3 | — | 9.6 | 73.2 |
| 6-11 | | — | — | — | — | 0.01 | 19.5 | 54.8 |
| 6-12 | | — | — | — | — | 0.2 | 15.1 | 61.3 |
| 6-13 | | — | 3 | — | — | 0.2 | 7.8 | 79.5 |
| 6-14 | | — | — | 3 | — | 0.2 | 6.3 | 81.1 |
| 6-15 | | — | — | — | 3 | 0.2 | 4.5 | 88.3 |
| 6-16 | | — | 3 | — | — | 0.5 | 6.6 | 80.1 |
| 6-17 | | — | — | 3 | — | 0.5 | 5.1 | 81.2 |
| 6-18 | | — | — | — | 3 | 0.5 | 3.8 | 87.6 |
| 6-19 | | — | — | — | — | 1 | 13.5 | 61.8 |
| 6-20 | | — | — | — | — | 2 | 12.3 | 62.5 |
| 6-21 | | — | — | — | — | 5 | 11.8 | 66.7 |

As can be seen from the examples in Table 6, the addition of the polynuclear molybdenum cluster ionic liquid into the cathode or the electrolyte of the electrochemical device both can achieve high cycle retention ratios and low thickness swelling rates.

According to the results of Tables 1 to 6, the cycle and storage properties of an electrochemical device at a high temperature can be improved by using the fluoropolymer having an X-ray diffraction spectrum with a diffraction peak in the range of $34°<2\theta<38°$ in combination with the compound having 2 to 3 cyano groups.

References to "some embodiments", "part of embodiments", "one embodiment", "another example", "example", "specific example" or "part of examples" in the whole specification mean that at least one embodiment or example in the application comprises specific features, structures, materials or characteristics described in the embodiments or examples. Thus, descriptions appear throughout the specification, such as "in some embodiments", "in an embodiment", "in one embodiment", "in another example", "in one example", "in a specific example" or "an example", do not necessarily refer to the same embodiment or example in the present application. Furthermore, the specific features, structures, materials or characteristics in the descriptions can be combined in any suitable manner in one or more embodiments or examples.

Although illustrative examples have been shown and described, it should be understood by those skilled in the art that the above examples cannot be interpreted as a limitation on the present application, and the examples can be changed, substituted and modified without departing from the spirit, principle and scope of the present application.

For example, as a kind of secondary battery, a lithium-ion secondary battery has been described. However, the applicable types of secondary batteries are not limited to this. The secondary battery of the present application can be similarly applied to a secondary battery wherein the capacity of an anode includes a capacity resulted from deintercalation of lithium ions and a capacity associated with precipitation and dissolution of a lithium metal, and the battery capacity is represented by the sum of these capacities. In this case, an anode material capable of deintercalating lithium ions is used as an anode active material, and a charge capacity of the anode material is set to a value smaller than the discharge capacity of a cathode.

In addition, the present application is applicable to battery devices of cylindrical types, laminated film types, and having a spirally wound structure. However, the applicable structures are not limited thereto. The secondary battery of the present application can be similarly applied to a battery having other battery structures such as a square type battery, a coin type battery and a button type battery, or a battery in which a battery device has other structures such as a laminated structure.

In addition, the cases using lithium as an electrode reactant have been described. However, the electrode reactant is not necessarily limited to this. As the electrode reactant, for example, other Group IA elements such as Na and K, Group IIA elements such as Mg and Ca, or other light metals such as Al may be used. The effect of the present application can be obtained irrespective of the kind of the electrode reactant, whereby a similar effect can be obtained even if the kind of the electrode reactant is changed.

In addition, regarding the content of each component, the appropriate range derived from the results of the embodiments is explained. However, the description does not completely exclude the possibility that the content is outside the above range. That is, the above-mentioned appropriate range is a particularly preferable range for obtaining the effects of the present application.

What is claimed is:

1. An electrochemical device, comprising a cathode, an anode and an electrolyte, wherein the cathode comprises a fluoropolymer which has an X-ray diffraction spectrum with a diffraction peak in the range of $34° \leq 2\theta \leq 38°$, and the electrolyte comprises a compound having 2 to 3 cyano groups.

2. The electrochemical device according to claim 1, wherein the fluoropolymer has a molecular weight distribution coefficient of $2 \leq Mw/Mn \leq 4$.

3. The electrochemical device according to claim 1, wherein the fluoropolymer has an Si element content of no more than 100 ppm.

4. The electrochemical device according to claim 1, wherein the fluoropolymer comprises at least one of the following monomers: vinylidene fluoride, hexafluoropropylene, pentafluoropropylene, tetrafluoropropylene, trifluoropropylene, perfluorobutene, hexafluorobutadiene, hexafluoroisobutylene, trifluoroethylene, chlorotrifluoroethylene, and tetrafluoroethylene.

5. The electrochemical device according to claim 1, wherein the fluoropolymer comprises polyvinylidene fluoride.

6. The electrochemical device according to claim 1, wherein the compound having 2 to 3 cyano groups comprises at least one of a dinitrile compound, a trinitrile compound, a dinitrile compound including an ether bond, or a trinitrile compound including an ether bond.

7. The electrochemical device according to claim 1, wherein the compound having 2 to 3 cyano groups comprises succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxaheptanedinitrile, 1,4-bis(cyanoethoxy)butane, diethylene glycol bis(2-cyanoethyl)ether, triethylene glycol bis(2-cyanoethyl)ether, tetraethylene glycol bis(2-cyanoethyl)ether, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, 1,2,4-tris(2-cyanoethoxy)butane, 1,1,1-tris(cyanoethoxymethylene)ethane, 1,1,1-tris(cyanoethoxymethylene)propane, 3-methyl-1,3,5-tris(cyanoethoxy)pentane, 1,2,7-tris(cyanoethoxy)heptane, 1,2,6-tris(cyanoethoxy)hexane, 1,2,5-tris(cyanoethoxy)pentane, or any combination thereof.

8. The electrochemical device according to claim 1, wherein the compound having 2 to 3 cyano groups is contained in an amount of 0.01 wt % to 15 wt % based on the total weight of the electrolyte.

9. The electrochemical device according to claim 1, wherein the compound having 2 to 3 cyano groups comprises at least two of succinonitrile, adiponitrile, ethylene glycol bis(propionitrile)ether, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane, or 1,2,4-tris(2-cyanoethoxy)butane.

10. The electrochemical device according to claim 1, wherein the electrolyte further comprises an additive A comprising at least one of cyclic carbonate containing a carbon-carbon double bond, a compound containing a sulfur-oxygen double bond, lithium difluorophosphate, or lithium tetrafluoroborate.

11. The electrochemical device according to claim 10, wherein the additive A comprises at least one of vinylethylene carbonate, ethylene vinyl ethylene carbonate, 1,3-propane sultone, ethylene sulfate, propylene sulfate, ethylene sulfite, methylene methanedisulfonate, lithium difluorophosphate, or lithium tetrafluoroborate.

12. The electrochemical device according to claim 10, wherein the additive A is contained in an amount of 0.01 wt % to 5 wt % based on the total weight of the electrolyte.

13. The electrochemical device according to claim 1, wherein the electrolyte further comprises a polynuclear molybdenum cluster ionic liquid comprising $[C_nH_{2n+1}\text{-methylimidazole}]_2[Mo_6O_{19}]$, wherein n=1-20 and the polynuclear molybdenum cluster ionic liquid is contained in an amount of 0.01 wt % to 5 wt % based on the total weight of the electrolyte.

14. The electrochemical device according to claim 1, wherein the cathode further comprises a cathode active material and a polynuclear molybdenum cluster ionic liquid comprising $[C_nH_{2n+1}\text{-methylimidazole}]_2[Mo_6O_{19}]$, wherein n=1-20 and the polynuclear molybdenum cluster ionic liquid is contained in an amount of 0.01 wt % to 2 wt % based on the weight of the cathode active material.

15. The electrochemical device according to claim 1, wherein the fluoropolymer has a crystallinity of 45% to 50%.

16. An electronic device, comprising an electrochemical device comprising a cathode, an anode and an electrolyte, wherein the cathode comprises a fluoropolymer which has an X-ray diffraction spectrum with a diffraction peak in the range of $34° \leq 2\theta \leq 38°$, and the electrolyte comprises a compound having 2 to 3 cyano groups.

17. The electronic device according to claim 16, wherein the fluoropolymer has a molecular weight distribution coefficient of $2 \leq Mw/Mn \leq 4$.

18. The electronic device according to claim 16, wherein the electrolyte further comprises an additive A comprising at least one of cyclic carbonate containing a carbon-carbon double bond, a compound containing a sulfur-oxygen double bond, lithium difluorophosphate, or lithium tetrafluoroborate.

19. The electronic device according to claim 16, wherein the fluoropolymer comprises at least one of the following monomers: vinylidene fluoride, hexafluoropropylene, pentafluoropropylene, tetrafluoropropylene, trifluoropropylene, perfluorobutene, hexafluorobutadiene, hexafluoroisobutylene, trifluoroethylene, chlorotrifluoroethylene, and tetrafluoroethylene.

20. The electronic device according to claim 16, wherein the compound having 2 to 3 cyano groups comprises at least one of a dinitrile compound, a trinitrile compound, a dinitrile compound including an ether bond, or a trinitrile compound including an ether bond.

* * * * *

UNITED STATES PATENT AND TRADEMARK OFFICE
CERTIFICATE OF CORRECTION

| | | |
|---|---|---|
| PATENT NO. | : 11,349,124 B2 | |
| APPLICATION NO. | : 16/648494 | |
| DATED | : May 31, 2022 | |
| INVENTOR(S) | : Kefei Wang | |

It is certified that error appears in the above-identified patent and that said Letters Patent is hereby corrected as shown below:

On the Title Page

Item (56) In the Foreign Patent Documents in the 15th entry:
Please delete the numbers "219771" and insert the numbers --3219771--

Signed and Sealed this
Eighteenth Day of October, 2022

Katherine Kelly Vidal
*Director of the United States Patent and Trademark Office*